United States Patent [19]

Vandenburgh

[11] 4,341,577
[45] Jul. 27, 1982

[54] VEHICLE TIRE AND METHOD OF MANUFACTURE

[76] Inventor: Garret K. Vandenburgh, 1008 Grove St., Winnetka, Ill. 60093

[21] Appl. No.: 786,068

[22] Filed: Apr. 11, 1977

[51] Int. Cl.³ .................................................. B29H 15/00
[52] U.S. Cl. .............................. 156/121; 156/128 R; 152/350; 152/354 R; 152/358; 156/123
[58] Field of Search ........... 156/91, 96, 110 R, 110 C, 156/118, 121, 122, 123 R, 128 R, 128 CL; 152/350, 354 R, 356 R, 357 R, 358

[56] References Cited

U.S. PATENT DOCUMENTS

| | | | |
|---|---|---|---|
| 500,658 | 7/1893 | Huss | 156/123 |
| 524,105 | 8/1894 | Doughty | 156/123 |
| 533,251 | 1/1895 | Straus | 152/354 |
| 548,673 | 10/1895 | Straus | 156/122 |
| 578,227 | 3/1897 | Fogarty | 152/357 |
| 596,930 | 1/1898 | Wykert | 152/354 |
| 651,745 | 6/1900 | Caldwell | 156/110 R |
| 1,456,829 | 5/1923 | Ratelle | 152/350 |
| 1,913,422 | 6/1933 | Wikle | 156/121 |
| 2,007,909 | 7/1935 | State | 152/354 |

OTHER PUBLICATIONS

"The History of the Pneumatic Tyre", by J. B. Dunlop, A. Thoms & Co. Ltd. (1925), pp. 12, 13–27.
"Tire Technology", by Kovac, pp. 44–50, copyright 1973 by Goodyear Tire & Rubber Company, 4th Edition.
"The Friction of Pneumatic Tyres", by Moore, pp. 16–19, Elsevier Scientific Publishing Co., Oxford Eng., 1975.
"Rubber Technology and Manufacture", edited by Blow, pp. 348–351, CRC Press, Cleveland, Ohio.

Primary Examiner—John E. Kittle
Attorney, Agent, or Firm—E. C. Vandenburgh

[57] ABSTRACT

A high performance bicycle tire comprises a casing of untreated woven fabric in the form of a toroid about an inner tube. Preferably the threads of the fabric are in bias alignment. A polyurethane tread is secured about the periphery of the casing.

9 Claims, 5 Drawing Figures

VEHICLE TIRE AND METHOD OF MANUFACTURE

BACKGROUND AND SUMMARY OF THE INVENTION

The present invention is concerned with high performance vehicle tires, i.e., tires having high inflation pressures. While the following discussion is primarily concerned with tires for racing bicycles, the concepts are applicable to tires for other vehicles where similar performance characteristics are desired.

Racing bicycle tires are commonly called "sew ups". They look somewhat like an ordinary bicycle inner tube with tread, but they are constructed quite differently. They comprise a casing in the form of a toroid enclosing a thin lightweight inner tube made of either butyl rubber or latex rubber. The latex tubes are lighter, but they are also somewhat air permeable, so much so that they loose significant pressure after a few hours.

These tires are constructed to minimize their weight as well as that of the wheel on which they are mounted. They are also designed to operate at high inflation pressures (in excess of seventy-five pounds per square inch, or 5.273 Kg./sq. cm.). The lightweight minimizes the moment of inertia of the tire and wheel, thus keeping the work required to accelerate the bicycle to a minimum. The high inflation pressures help reduce rolling resistance.

The casing of the commercially available racing tires is a rubber casing reinforced with bias ply unidirectional roving (individual threads) made of either cotton or silk. This casing is made as light as possible and it contains a high percentage of fiber and a low percentage of rubber in order to minimize the weight. However, due to its lightweight construction it is fragile. A sharp blow caused by hitting a stone or chuck hole causes a weakening of the rubber bond between single fibers of the unidirectional roving, and the roving separates at the weakened point. If this does not result in instant failure, it permits a blister to form, a blister which is pushed outward by the high inflation pressure in the inner tube. Such a blister is an incipient point of rapid failure.

The casing is sewn together at the inside with either cotton or linen thread. This seam is used during construction for inserting the inner tube and it also permits access to the tube for repairs in the event of a puncture caused by a sharp object such as a nail. It is impossible to repair the assembly if there is serious damage to the casing.

In the present tires a rubber tread piece is bonded to the casing with rubber. This tread piece serves as a point of wear; it provides added protection to the casing along the line of road contact; and it provides a piece in which a tread pattern can be formed. Tread patterns are varied depending upon the intended running surface and condition (i.e., concrete road or wooden track, wet or dry surface, etc.).

These present tires weigh a minimum of approximately ninety grams to a maximum of approximately four hundred grams. A very light tire intended for track racing might weigh ninety grams (although a one hundred and ninety gram tire is considered to be excellent) while a heavy tire intended for use on rough roads might weigh four hundred grams. These weights are that of the complete tire which has a tube enclosed therein.

These present tires present significant problems for the user. They are easily damaged and thus they have very short life expectancy. The construction using unidirectional roving bonded together with rubber puts a premium on the rubber bond and the quality of this bond is difficult to maintain under production conditions. Premature failure of casings very early in their life is not common, even after only a few miles of riding.

One possible improvement would be to substitute a strong synthetic material (nylon, polyester, glass, or kevlar) for the cotton or silk unidirectional bias ply roving. This has probably not been done in the present tires because of the difficulty in obtaining an adequate bond between the rubber matrix and these synthetics. There is very little rubber available (if the weight of the tire is to be held down) and rubber will not bond as well to the smooth long fiber synthetics as it will to the natural cotton or silk. As an added argument against this substitution, the present failures are seldom caused by fracture of the fibers in the casing, but the failures are more often caused by tearing the rubber bonding material which holds the fibers together.

My invention comprises replacing the troublesome casing made of unidirectional roving and rubber with a casing made of a synthetic fiber woven cloth. Using woven cloth assures a strong assembly in all directions, eliminating the weakness of the rubber bond. Any strong synthetic fiber such as nylon, polyester, glass, or kevlar might be used, but I have been using a Dacron polyester in my prototypes. Desirably the cloth would not have a surface treatment which would tend to weaken its fibers. The smaller the memory error in the plastic of which the cloth threads are formed the better will be the resulting tire as hereinafter discussed. An advantage in the use of plastic (synthetic material) threads in the cloth resides in the fact that such threads will have a hard, smooth surface as compared to threads of a natural material. Thus, the threads are better able to slide on each other and the resulting tire will have less memory and be a better riding tire. To this cloth casing I bond a polyurethane tread piece. Polyurethane has very high abrasion and tear resistance as compared with rubber or other plastics. In the right formulations and durometers it has a high coefficient of static friction and a low coefficient of rolling friction. Other synthetic materials such as nitril rubber or natural rubber could be similarly employed.

J. B. Dunlop is usually regarded as the inventor of the pneumatic tire. His initial construction was a toroid consisting of a layer of rubber impregnated, non-synthetic fabric alone or sandwiched between two layers of rubber. See the book "The History Of The Pneumatic Tyre" by J. B. Dunlop, A. Thoms & Co. Ltd. [probably 1925]. This form of tire lasted only briefly before being replaced by the "clincher" type design having an omega cross-section. See the book "Encyclopedia Of Polymer Science & Technology", John Wiley and Sons (1971), Vol. 14, pg. 42. Thus it was, perhaps, nothing more than an abandoned experiment. In any event, such an impregnated fabric would be unsuitable for the high performance tire with which the present invention is concerned. In the first place such impregnation adds weight, a very undesirable characteristic. Secondly, it prevents the fibers or threads of the cloth from moving with respect to each other when the tire is in use. I believe that such movement contributes to the desirable characteristics of my tire.

A tire made in accordance with my invention can easily be within the "excellent" weight range for tires of conventional construction. At the same time the other advantages discussed herein are obtained.

The rims on which racing bicycle tires are used do not have flanges between which the tire is received, as is the case with the usual pleasure bicycle. Instead, the periphery of the rim is only slightly concave (in transverse cross-section) to form a saddle in which the tire is seated. It is the practice to hold the tire in this saddle by means of an adhesive, but if the bond fails the tire is likely to come off the rim.

I have found that by cutting the cloth body for my tire casings so that the woof and warp threads run in a bias direction (i.e., about forty-five degrees to the elongated dimension of the blank from which the casing is formed), that the tires tighten down nicely onto the rims when they are inflated. By making them this way, the material stretches in a bias fashion and the circumference of the tire shortens as the inflation pressure is increased. This also assures that the outer fibers of the tire are highly tensioned when the tire is used, so any wave in the tire surface ahead of the point of contact with the road will be minimized. The larger the wave, the greater will be the rolling resistance. It also has the advantage of compensating for minor size variations in the circumferential size of the casing so that manufacturing tolerances need not be extremely critical. Correspondingly, the gluing of the tires to the rims does not become as critical. In the Dunlop book, supra, the bias alignment of the cloth is mentioned, but indicated to be undesirable. In contrast, I obtain important advantages therefrom.

My present casings are cut from flat pieces of hard woven cloth and seamed at the ends to form a hoop. It is important to cut the end seams on a bias and sew them on a bias to match the thread lines of the woven cloth. When the seaming does not match the cloth thread lines, the cloth stretches or pulls unevenly at the end seams and creates bumps or hollows. The end seams may be cut with a single bias cut, or with multiple cuts to form a "V" or a "W" on the end seam. It would also be possible to weave the cloth casing in the form of a hoop, eliminating the end seam entirely.

Other objects and advantages of the present invention will be apparent from the following description.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
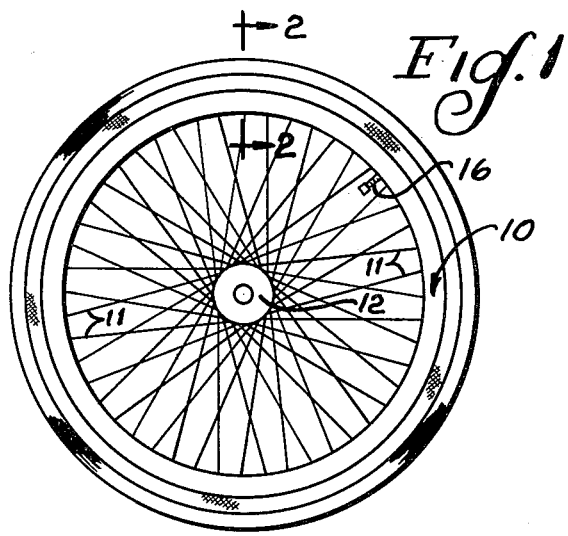
FIG. 1 is an illustration of a racing bicycle rim with a tire embodying my invention mounted thereon.
Figure 2:
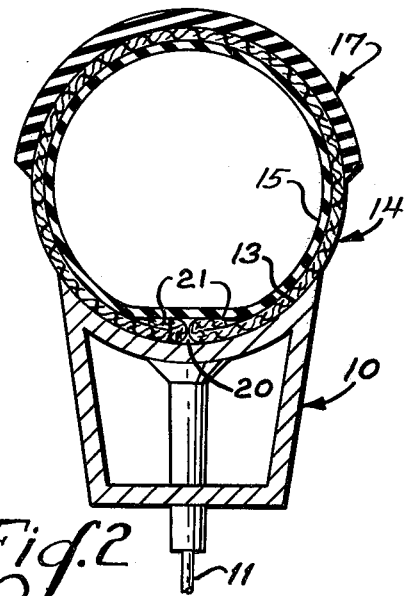
FIG. 2 is a section taken at line 2—2 of FIG. 1.
Figure 3:
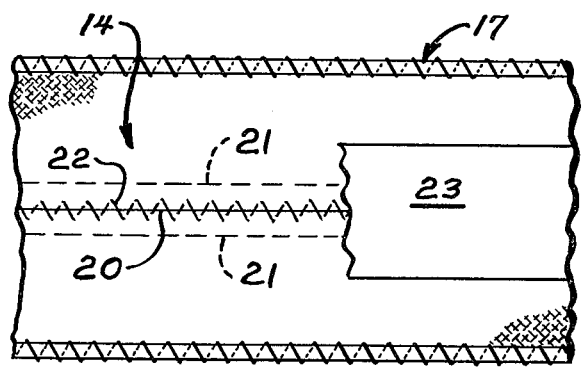
FIG. 3 is a view of the inside face of the tire of FIG. 1.

FIGS. 1 and 2 illustrate a tire embodying my invention mounted on a conventional wheel of a racing bicycle. Such a wheel comprises a rim, generally 10, and spokes 11 connecting the rim and a hub 12. The rim is a generally box section, as seen in FIG. 2, with its outer face 13 concave to form a saddle in which the tire seats. The tire of my invention comprises a fabric body, generally 14, which encompasses an inner tube 15. This tube is conventional and, of course, includes a valve stem 16 which extends through the fabric body and rim. A tread layer, generally 17, is affixed to the exterior of the fabric body.

In the illustrated embodiment, the cloth of body 14 is formed of Dacron threads. This cloth does not have any washing, burnishing or other treatment after it is woven. It contains no impregnation. A suitable cloth would be one made from a thread of about 0.0055 inches in diameter, having 40 threads per inch in the woof and the warp which are at ninety degrees to each other. At the circumferential seam 20 the edges of the cloth are turned back in the form of hems 21 and are sewn together as indicated at 22. Preferably a cotton tape 23 is affixed over the seam, as by means of an adhesive, to protect the seam against abrasion.

This fabric body is formed from a blank having an elongated dimension of a size to form the circumference of the casing in the plane of the wheel and a width, or narrow dimension, of a size to form the transverse circumferential size desired for the casing. While such a blank could be a slice of a material which is woven in tubular fashion, I have been using straight blanks cut from a bolt of sheet goods. This, of course, requires that an end seam be formed in the blank as an initial step in the making of the casing after the blank is cut. Such an end seam is illustrated in FIG. 4.

Figure 4:
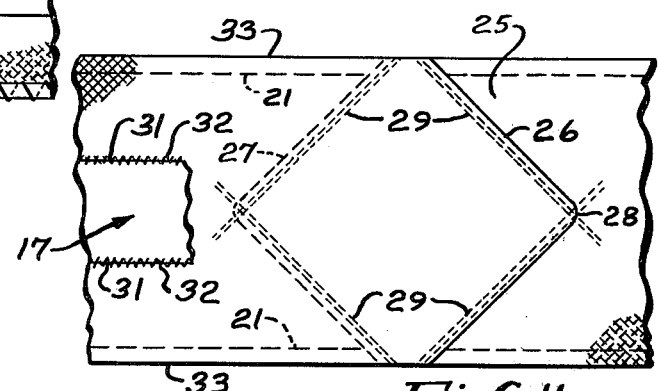
FIG. 4 is a plan view of the blank employed in the manufacture of the tire of FIG. 1.

Before describing the end seam, it should be noted that the blank 25 of FIG. 4 has been cut on the bias of the cloth from which the blank was cut. That is, the woof and warp threads of the cloth of blank 25 are positioned at about a forty-five degree angle to the longitudinal or transverse directions of the blank. The two ends 26 and 27 of the blank are then cut in the form of a "V", with the cuts being parallel to the woof and warp threads respectively, the ends of the "V" are rounded off as seen at 28. These ends are overlapped in the manner illustrated in FIG. 4 and then are sewn as illustrated by the dotted lines 29. This sewing is done parallel to the woof and warp threads respectively. This avoids bunching or bulging in the finished casing. FIG. 4 does not purport to represent the exact number of rows of sewing that is employed, which will be a matter of selection by the manufacturer taking into consideration the factors such as the strength desired, the particular materials employed, etc. The hems 21 do not extend across the area where the ends of the blank are overlapped.

The cuts on the ends of the blanks may be such as to form a plurality of vees, e.g., a "W", etc. The use of the vee (singular or plural) configuration on the ends of the blanks allows the sewing to be parallel to the cloth threads and ameliorates the extent of the bump as the bicycle is ridden and the overlap area rotates to the bottom of the tire.

After the blank has been formed into a ring as just described, the tread piece 17 is affixed to the blank. In the illustrated embodiment this tread piece is cut from sheet urethane produced by J. P. Stevens and is their black No. 2080 which is 0.030 inches (0.762 mm) thick.

In this embodiment the tread is the same thickness throughout, but it may be desirable to have it thinner along the side edges 31. This can be done by forming the tread strip as an extrusion through an appropriately shaped die. The length of the tread strip is such that its ends will butt or overlap when positioned about the ring defined by the end-sewn blank. In either event the ends are heat sealed together.

The thread strip is adhesively bonded to the cloth casing and sewn, as indicated at 32, along the side edges 31. The adhesives presently available to me do not bond sufficiently well to the Dacron cloth to prevent a "peeling" from commencing along the side edges, which is the reason for the sewing. Adhesives that have proven satisfactory when the edges are sewn and which I have used are urethane based adhesives such as Bostik 7070, rubber based adhesives such as Bostik 4045, and double sided film adhesives such as Fasson Industrial Products Division's tape No. 220. A zigzag stitch is employed in the sewing 32.

After the tread is thus affixed, the center seam 20 is sewn. This is done by overlapping the two sides at the hems 21 and using a zigzag stitch in a manner such that the needle movements are first through the cloth and then alternately beyond the edge of the cloth. This provides slack in the thread so that after the seam 20 is completely sewn, the two edges 33 may be moved into abutting alignment as illustrated in FIG. 2. Of course, as this center seam 20 is sewn, the blank 25 is wrapped around the inner tube 15 so that the inner tube is within the toroid formed by the casing upon the completion of the sewing. I prefer to use a nylon thread for sewing this seam because of its strength and elasticity.

After the center seam has been thus formed, a protection strip 23 is affixed by means of an adhesive, such as Bostik 4045. The strip 23 is cotton webbing having a width of five-eighths of an inch (15.875 mm). To clamp this strip against the casing while the glue sets, the assembly is mounted on a wheel rim (or similar cylindrical surface) and the tube inflated. With the bias threads in the cloth, the inflation of the tube results in circumferential contraction of the casing causing the casing to securely clamp the protection strip between the casing and the rim. This protection strip not only protects the seam against abrasion but it also provides a good bond for the mastic used to fasten the tire to the rim. This cotton webbing has been adhesively bonded to the polyester casing with a rubber adhesive such as Bostik 4045, but any flexible adhesive which will bond to the materials could be used.

Figure 5:
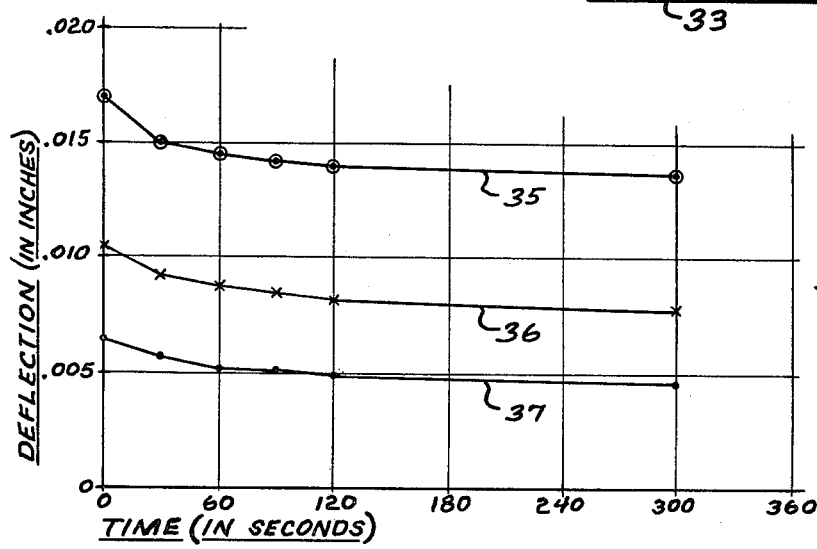
FIG. 5 is a graph illustrating residual deflection in several tires after they have been loaded and the load removed.

There are pronounced differences in the riding characteristics of tires presently on the market. Some seem to be soft riding and some hard riding. Tires produced in accordance with the present invention are soft riding. It is as though the tires had different spring constants in the side walls. I tested several different racing tires of conventional construction to determine their spring constant. The tires were of different design from different manufacturers. Some were cotton and some silk. I also compared them with my tire. In each instance I inflated the tire to a pressure of eighty-five p.s.i. (5.976 Kg./sq.cm.), loaded the axle with weights up to sixty pounds (27.22 Kg.), and measured the deflection of the tire as it was loaded. To my surprise, I found that the deflection of all of the tires did not vary by more than ten percent. Further, I discovered that none of the tires returned exactly to their original position when the weight was removed. Each had some residual deflection. FIG. 5 shows the residual deflections for three tires; line 35 was an average quality cotton tire, line 36 was a premium silk tire, and line 37 was my tire. The sixty pound weight was removed at zero seconds. If the tire were perfectly elastic, the deflection would have come back to zero. None of the tires did come back to zero. Even more surprising, none of them came back to zero after the tires was lifted from the surface on which it rested and rotated through exactly one revolution. My tire had roughly sixty percent of the residual deflection of the expensive silk tire, and the expensive silk tire had approximately sixty percent of the residual deflection of a cotton tire. My tire looked even better after one revolution in comparison with the others.

These deflections may at first glance not look significant, but the total deflection under a sixty pound load was approximately 0.105 inches (2.667 mm), so the residual deflection of the cotton tire was over fifteen percent of its total deflection and that of the silk tire was over ten percent of its total deflection.

It seems likely that much of the hard riding quality of such tires is not caused by a lack of suppleness in the side walls, but rather by an inordinately high residual deflection. My tires are soft riding. They also have very small residual deflections. The unique construction of the casing of my tires surprisingly seems to result in small residual deflections and I believe this accounts for their excellent riding characteristics.

I claim:

1. In a method of manufacturing a high performance tire which includes a casing encompassing an inner tube inflated to a pressure of at least seventy-five pounds per square inch, said casing being formed from a blank of fabric which fabric has two groups of threads running completely across the blank in two directions respectively, which directions are transverse to each other, and said blank has ends and elongated sides, and wherein said sides are sewn together and said ends are sewn together to form said blank into a toroid about the tube, the improvement comprising the step of:
   cutting said blank from fabric consisting essentially of said threads and so that the threads of one of said groups are at an angle of approximately forty-five degrees to said sides.

2. In a method as set forth in claim 1 and wherein said tire also has a tread on said casing, the further improvement comprising the step of:
   adhesively affixing a supplemental layer of tread to said blank before the blank is sewn into a toroid.

3. In a method as set forth in claim 2, including the step of sewing the sides of the supplemental layer to the casing blank.

4. In a method as set forth in claim 1 and wherein said groups comprise woof and warp threads respectively, the step of cutting parts of the ends of the blank parallel to the woof threads.

5. In a method as set forth in claim 4, wherein said parts of the ends of the blank are sewn with stitching parallel to the warp threads.

6. In a method as set forth in claim 5, wherein other parts of the ends of the blank are cut parallel to the warp threads.

7. In a method as set forth in claim 6, wherein said other parts of the ends of the blank are sewn with stitching parallel to the woof threads.

8. In a method as set forth in claim 1 and wherein said groups comprise woof and warp threads respectively, the step of cutting parts of the ends of the blank parallel to the warp threads.

9. In a method as set forth in claim 8, wherein said parts of the ends of the blank are stitching parallel to the warp threads.

* * * * *